Figure 3:
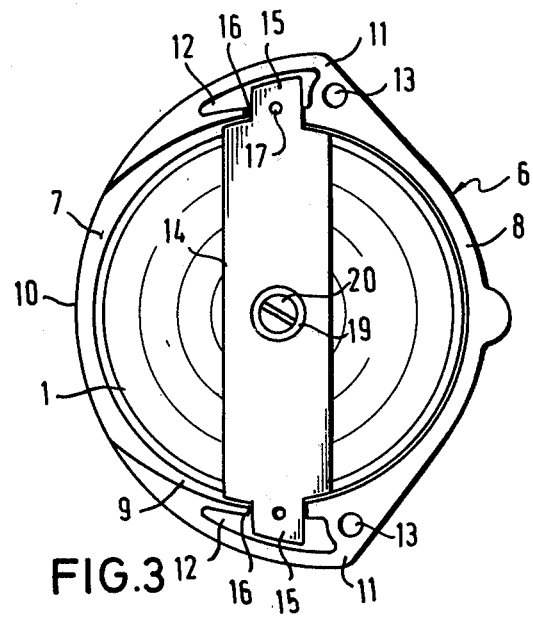

United States Patent [19]

Hüttinger

[11] 4,361,048
[45] Nov. 30, 1982

[54] POINTER INSTRUMENT MOVEMENT

[75] Inventor: Johann Hüttinger, Deggendorf, Fed. Rep. of Germany

[73] Assignee: Helmut Bernhardt GmbH u. Co. KG, Metten, Fed. Rep. of Germany

[21] Appl. No.: 214,213

[22] Filed: Dec. 8, 1980

[30] Foreign Application Priority Data

Oct. 9, 1979 [DE] Fed. Rep. of Germany ....... 2940969

[51] Int. Cl.³ .............................................. G01L 7/12
[52] U.S. Cl. ....................................... 73/729; 73/386; 116/266; 116/284
[58] Field of Search ................. 116/284; 73/386, 387, 73/729, 179

[56] References Cited

U.S. PATENT DOCUMENTS

| | | | |
|---|---|---|---|
| 1,664,417 | 4/1928 | Hunt et al. | 73/386 X |
| 2,178,027 | 10/1939 | Wright et al. | 73/387 |
| 3,124,004 | 3/1964 | Zenger | 73/386 |
| 3,358,505 | 12/1967 | Andresen, Jr. | 73/179 |
| 3,451,272 | 6/1969 | Frey et al. | 73/729 X |
| 3,805,618 | 4/1974 | Csaposs et al. | 73/386 X |
| 4,238,958 | 12/1980 | Dostmann | 73/386 |
| 4,255,970 | 3/1981 | Van Pottelberg | 73/386 |

Primary Examiner—Daniel M. Yasich
Attorney, Agent, or Firm—Gerald J. Ferguson, Jr.; Joseph J. Baker

[57] ABSTRACT

A pointer instrument movement is disclosed including a chassis of integrally moulded plastic, a pointer shaft rotatably mounted on the chassis, a lifting member, a measured value pickup which converts changes of the measured quantity to a mechanical deflection, a measured value transducer having a rocker connected to said lifting member for converting the mechanical deflection of the measured value pickup into a rotation of the pointer shaft, the rocker being formed integrally with said chassis.

15 Claims, 10 Drawing Figures

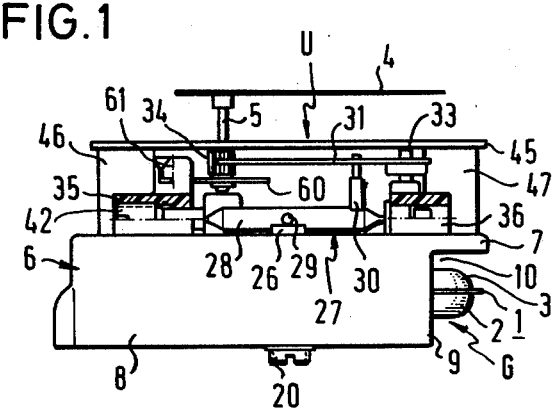
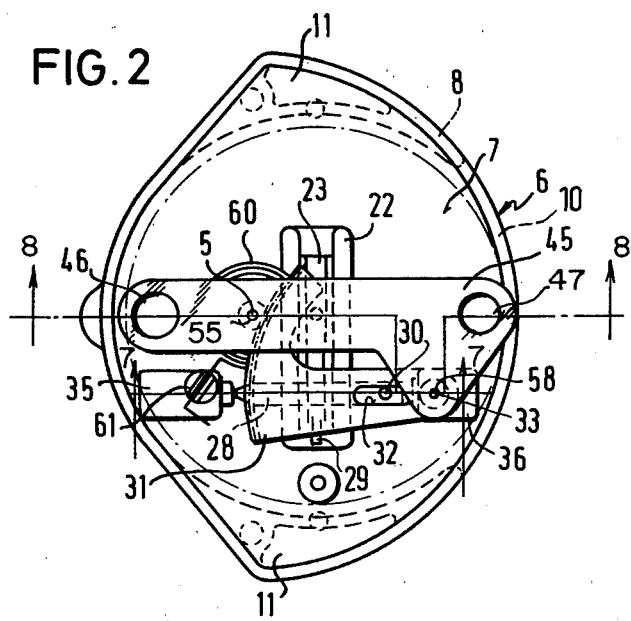

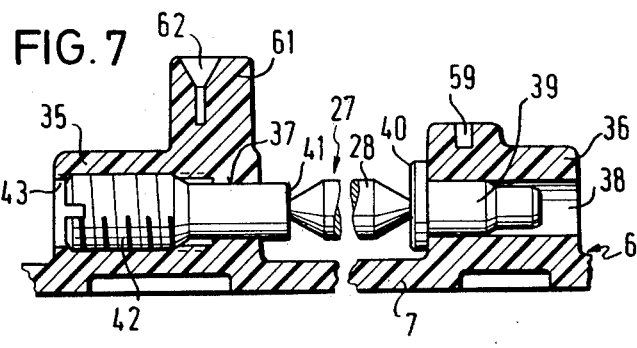
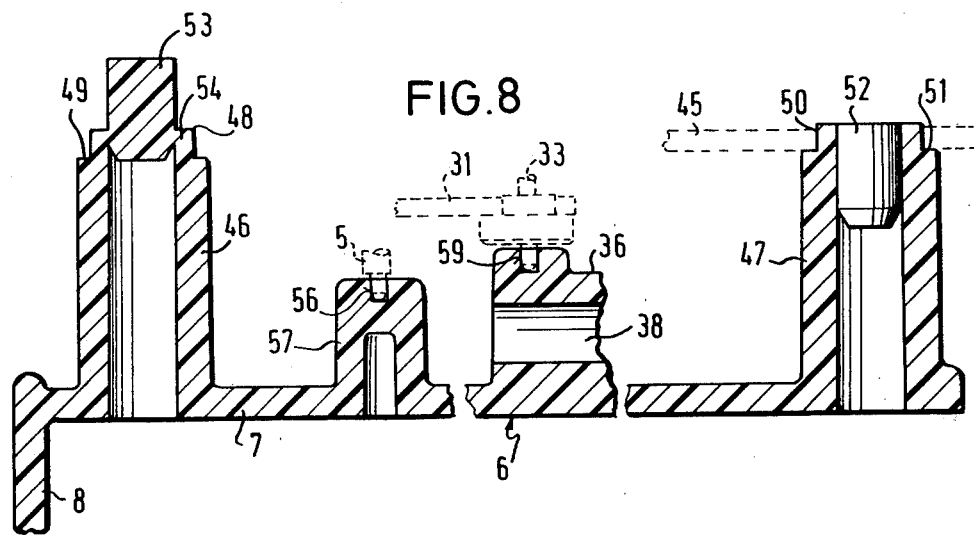
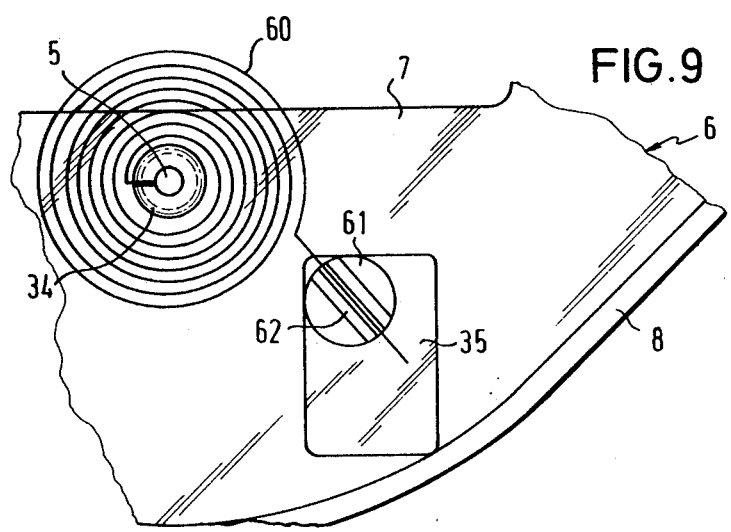

POINTER INSTRUMENT MOVEMENT

The invention relates to a pointer instrument movement comprising a chassis, a pointer shaft rotatably mounted on the chassis, a measured value pickup which converts changes of the measured quantity to a mechanical deflection of a lifting member and a measured value transducer which converts the mechanical deflection of the measured value pickup into a rotation of the pointer shaft.

Pointer instrument of this type require considerable production and assembly expenditure, in particular when a compact structure is required but the measured value transducer must have a large overall transmission ratio, i.e. a relatively small deflection of the measured value pickup must be converted to a large pointer deflection. An example of such a pointer measuring movement is a vacuum metal capsule vacuum meter in which a pressure change of about 100 mm Hg gives a deflection of the vacuum metal capsule of about 0.4 mm which is to be converted to a pointer deflection of 360°. Such a large transmission ratio can only be achieved with a multistage transmission chain which moreover must execute a change of direction because the requirement of a compact structure can only be met if the pointer shaft is perpendicular to the surface of the vacuum metal capsule so that the mechanical deflection is directed parallel to the axis of the pointer shaft. Consequently, precise mounting of a series of transmission components of small dimensions is required and particular steps must be adopted to minimise the friction resistances in the measured value transducer and eliminate any play.

The problem underlying the invention is to provide a pointer instrument movement of the type indicated which even with large transmission ratio of the measured value transducer can be made with low production and assembly expenditure in a very compact design.

According to the invention this is achieved in that the chassis is an integral moulded part of plastic which has a planar partition, that the measured value pickup is mounted on the one side of the partition so that the lifting member faces the partition and the mechanical deflection is directed substantially perpendicularly to the partition, that the pointer shaft is mounted on the other side of the partition perpendicularly to the latter, that in the partition a cutout is formed, that in the cutout a rocker forming a member of the measured value transducer is mounted pivotally about an axis parallel to the partition, and that the rocker is connected to the lifting member in such a manner that the mechanical deflection is transmitted to the rocker.

The chassis of the measured value transducer may be made as integral plastic moulding, for example by injection moulding, in simple manner economically with great accuracy, and the parts necessary for mounting the various members of the measured value transducer may mostly be formed integrally. The rocker disposed in a cutout of the partition forms without additional space requirement the first member in the transmission chain of the measured value transducer and as a result all the following members of the measured value transducer lie on the side of the partition remote from the measured value pickup. The assembly of these members is thereby greatly facilitated and a very compact structure may be achieved. Furthermore, installation and removal of the measured value pickup is completely independent of the measured value transducer.

Advantageous further developments and advantages of the invention are characterised in the subsidiary claims.

Figure 4:
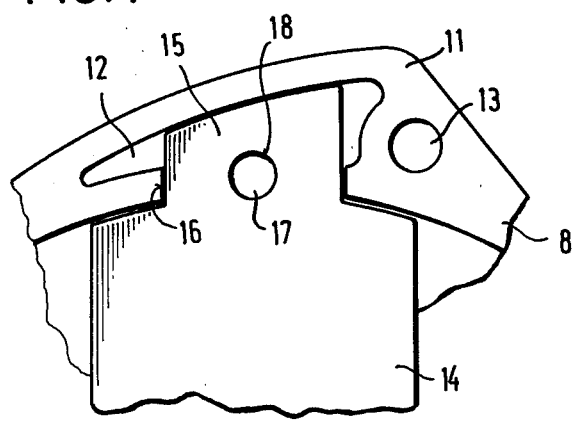
Figure 5:
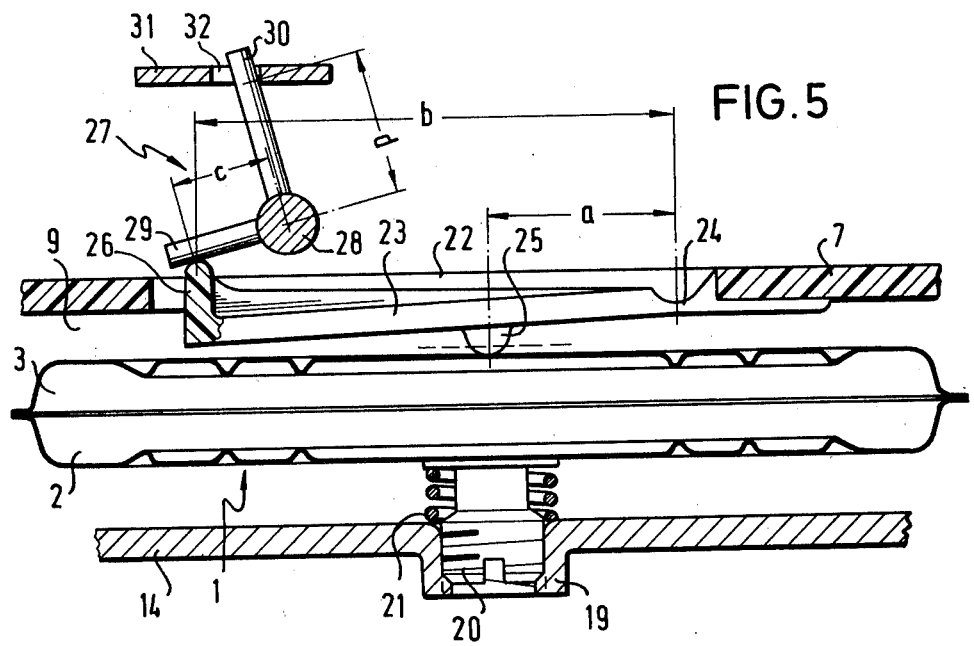
Figure 6:
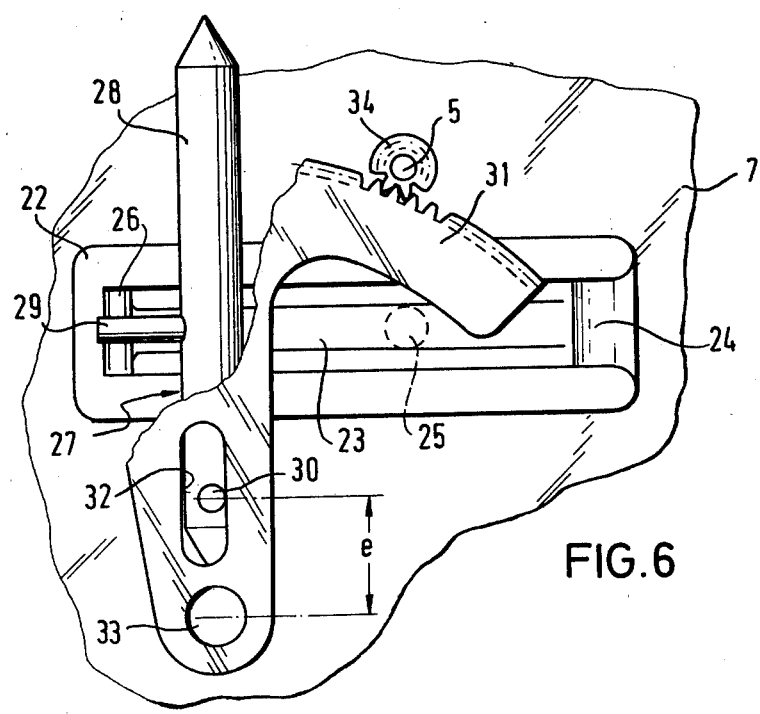
Figure 10:
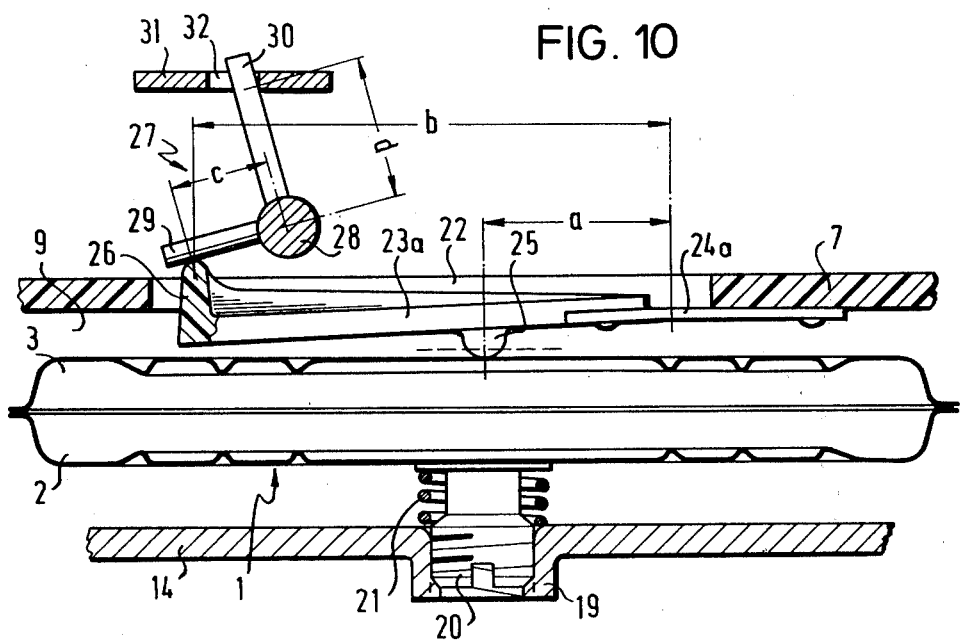

Further features and advantages of the invention will be apparent from the following description of examples of embodiment illustrated in the drawings, wherein:

FIG. 1 is a side view of a pointer instrument movement according to the invention;

FIG. 2 is a plan view of the pointer instrument movement of FIG. 1 with the pointer removed, FIG. 3 is a bottom view of the pointer instrument movement of FIGS. 1 and 2, FIG. 4 is a detail view of the mounting of the support plate, FIG. 5 is a detail view of the measured value pickup, the rocker and the angle lever, FIG. 6 is a plan view of the arrangement of FIG. 5, FIG. 7 is a partial sectional view of the mounting of the angle lever taken along lines 7—7 of FIG. 2, FIG. 8 is a partial sectional view of the holding parts for the plate taken along lines 8—8 of FIG. 2, FIG. 9 is a detail view of the anchoring of the spiral spring and FIG. 10 is a detail view similar to FIG. 5 having a modified embodiment of the rocker.

The pointer instrument movement illustrated in the drawings comprises essentially a measured value pickup G and a measured value transducer U. The example illustrated in a vacuum meter movement whose measured value pickup G is formed by a stabilised vacuum metal capsule 1 which consists of two metal diaphragms 2, 3 joined together at the edge in gas-tight manner. By suitably biasing the metal diaphragms it is ensured that the ambient air pressure does not press them against each other but that depending on the air pressure the spacing between them varies in magnitude. Such a diaphragm capsule is referred to as stabilised diaphragm capsule in contrast to the also known non-stabilised diaphragm capsules in which the metal diaphragms are held spaced apart by an additional support spring. Since the one metal diaphragm 2 is fixed in a manner explained hereinafter the other metal diaphragm 3 is mechanically deflected when the air pressure changes. The measured value transducer U is a transmission mechanism having a corresponding total transmission ratio which converts the deflection of the measured value pickup G into a readable rotational movement of a pointer 4 which is secured to a rotatably mounted pointer shaft 5. The measured value transformer U must convert the small deflections of the diaphragm capsule (about 0.4 mm for 100 mm Hg) to a large pointer deflection (360°) and for this purpose has a large total transmission ratio which is achieved by various transmission stages.

All parts of the pointer instrument movement are carried by a chassis 6 which is formed as integral plastic moulding made for example by injection moulding. The chassis 6 comprises a planar partition 7 and as apparent from FIG. 1 the measured value pickup G lies on the one side of the partition 7 (at the bottom in FIG. 1) whilst the measured value transducer U is disposed on the other side of the partition (the top in FIG. 1), the pointer shaft 5 being perpendicular to the partition 7.

At the edge of the partition 7 is a peripheral wall 8 which extends over the greater part of the periphery and in the illustration of FIG. 1 projects downwardly from the partition. The inner surface of the peripheral wall defines a substantially circular chamber 9 in which the vacuum metal capsule 1 is accommodated; at the point at which the peripheral wall 8 is interrupted there is a cutout 10 in which the vacuum metal capsule 1 is visible in FIG. 1. The outer surface of the peripheral wall 8 is not circular but has two substantially diametrically opposite lateral bulges 11 (FIGS. 2 and 3) in each of which a cavity 12 is formed. In the solid part of each bulge 11 there is a bore 13 into which a metal screw can be screwed for securing the chassis to a support, for example the bottom of an instrument housing.

Extending transversely over the open lower side of the chamber 9 parallel to the partition 7 is a support plate 14 on which the vacuum metal capsule 1 is secured (FIG. 3). The support plate 14 is secured in the lateral bulges 11 at the lower side of the peripheral wall 8 in the manner shown in detail in FIG. 4. For this purpose the support plate 14 comprises at each end a lug 15 of smaller width which is inserted in a corresponding cutout 16 at the portion of the peripheral wall 8 bordering the inside of the cavity 12 so that the support plate 14 is flush planar with the lower side of the peripheral wall 8. A plastic pin 17 formed in the cutout 16 on the peripheral wall 8 is inserted through a corresponding bore 18 of the support plate and rivetted. This provides in simple manner a reliable and very accurate locating of the support plate 14.

Disposed in the centre of the support plate is a threaded bush 19 (FIG. 5) into which a grub screw 20 secured to the lower metal diaphragm 2 is screwed. A pressure spring 21 surrounding the grub screw 20 eliminates any flank clearance between the grub screw 20 and the threaded bush 19. By turning the grub screw 20 with the aid of a screwdriver it is possible to adjust the distance between the metal diaphragm 2 and the support plate 14.

Since the metal diaphragm 2 is thus fixed relatively to the chassis the metal diaphragm 3 forms the lifting member of the measured value pickup which faces the partition 7 and when the air pressure changes undergoes a mechanical deflection of small stroke in the direction towards the partition 7 or away from the latter.

As shown in FIG. 5 in the partition 7 an elongated cutout 22 is formed in which a rocker 23 is mounted by means of an articulation 24 pivotally about an axis lying parallel to the partition 7. In the example of embodiment illustrated in FIG. 5 the rocker 23 is made integrally with the chassis so that it consists of the same plastic as the chassis 6. The articulation 24 in this case is formed by a point of reduced cross-section which is provided in the rocker 23 near the connecting point with the partition 7. At the lower side of the rocker 23 facing the vacuum metal capsule 1 a sensing projection 25 is formed which bears on the upper side of the metal diaphragm 3 in the centrepoint thereof. The bearing face of the sensing projection 25 is rounded. The rocker 23 is formed on the partition 7 projecting inclined downwardly so that on installation of the vacuum metal capsule 1 it is pressed upwardly. This provides a resilient biasing which holds the sensing projection 25 in engagement with the metal diaphragm 3.

By the construction described the mechanical deflection of the metal diaphragm 3 produced by air pressure changes is converted to a pivotal movement of the rocker 23 about the articulation 24.

Formed at the free end of the rocker 23 is a lug 26 projecting upwardly out of the cutout 16 and transmitting the pivot movement of the rocker 23 to an angle lever 27 which is mounted on the upper side of the partition 7 rotatably about an axis parallel to the partition. As apparent from FIGS. 1 and 6 the angle lever is formed by a spindle 28 point-mounted at both ends, from which two pins 29, 30 project radially at a right-angle to each other and axially spaced apart. The shorter pin 29 forms the one arm of the angle lever and engages the rounded top side of the lug 26 (FIG. 5); the longer pin 30 which forms the other angle lever arm projects upwardly into a cutout 32 of a toothed segment 31 which is rotatably mounted by means of a shaft 33 perpendicular to the partition 7 and meshes with a pinion 34 disposed on the pointer shaft 5 (FIG. 6).

As apparent from FIG. 5 the rocker 23 forms a one-armed lever which transmits the deflection of the metal diaphragm 3 in the ratio of the lever arms b:a which is defined by the spacings of the sensing projection 25 and the lug 26 from the articulation 24. The angle lever 27 is a two-armed lever which gives a further lever transmission in the ratio of the effective lever arms d:c. A third lever transmission is effected in the toothed segment 31 in the ratio of the radius of the toothing of the toothed segment to the distance e of the point of engagement of the pin 30 from the axis of rotation of the toothed segment. Finally, between the toothed segment 31 and the pinion 34 there is a gear transmission in the ratio of the radii of the toothed segment and the pin.

FIG. 7 shows the details of the mounting of the angle lever 27 on the chassis 6. Formed at the top of the partition 7 in spaced relationship are two bearing blocks 35, 36 in which coaxial bores 37, 38 are formed. Inserted into the bore 38 of the bearing block 36 is a point bearing 39 which by a collar 40 of greater diameter formed at the end is supported at the end face of the bearing block 36. Inserted into the bore 37 of the bearing block 35 is a point bearing 41 which is provided with a threaded head 42 which is screwed into a threaded portion 43 of the bore 37. After the insertion of the two bearing points disposed at the ends of the spindle 28 into the two point bearings the bearing clearance can be exactly adjusted by screwing the threaded head 42.

For mounting the pointer shaft 5 and the shaft 33 of the toothed segment 31 a plate 45 of metal is disposed above the partition 7 parallel to the latter. For this purpose, at the top of the partition 7 two spacer columns 46 and 47 are formed (FIG. 8) which in the example of embodiment illustrated are hollow over their entire height. The spacer column 46 has at the upper end a portion 48 of reduced cross-section so that a shoulder 49 is formed. In corresponding manner the spacer column 47 has at the upper end a portion 50 of reduced cross-section so that a shoulder 51 is formed. The plate 45 has two openings which are exactly adapted to the cross-sections of the portions 48, 50; the portions 48, 50 are inserted through said openings so that the plate 45 bears on the shoulders 49, 51. The plate is secured on the spacer columns 46, 47 by a press joint by means of a plug which after positioning of the plate is pressed into the hollow interior of the spacer column. In FIG. 8 the finished press joint at the column 47 is shown after pressing in of the plug 52. At the column 46 of FIG. 8 a particularly advantageous step for producing this press connection is illustrated: the plug 53 is integrally formed at the end of the spacer column 46 in such a manner that it is connected to the spacer column by an easily shearable plastic bridge 54. After positioning of the plate a downwardly directed pressure is exerted on the top of the plug 53 by which the plastic bridge is sheared off and the plug 53 is then pressed into the hollow interior of the spacer column 46.

The plate 45 is provided with a bearing bore 55 through which the outwardly projecting end of the pointer shaft 5 is passed. The lower end of the pointer shaft 5 is mounted in a blind bore 56 which is formed in the top of a bearing pedestal 57 which is integrally formed with the chassis 6 at the top of the partition 7. The axis of the pointer shaft 5 is eccentric to the centre of the partition 7 and the vacuum metal capsule 1; this gives a particularly compact structure when the angle deflection of the pointer 4 is restricted to less than 180°.

The upper end of the shaft 33 of the toothed segment 31 is mounted in a further bearing bore 58 in the plate 45 whilst the lower end of the shaft 33 is mounted in a blind bore 59 formed at the top of the bearing block 36.

To ensure that even small pressure fluctuations produce an indication a clearance-free transmission of the movements of the metal diaphragm 3 to the pointer shaft 5 must be ensured. This is done at the rocker by the already mentioned resilient biasing with which the sensing projection is pressed against the metal diaphragm. Clearance in the remaining parts of the transmission mechanism is taken up by a return spring which exerts a turning moment on the pointer shaft 5. In the example of embodiment illustrated this return spring is formed by a spiral spring 60 which surrounds the pointer shaft beneath the pinion 34 and is anchored with its inner end to the pointer shaft. The outer end of the spiral spring 60 is anchored to a block 61 which is integrally formed at the top of the bearing block 35 and comprises an upwardly widening slot 62 into which the end of the spiral spring is inserted (FIGS. 7 and 9).

The slot for anchoring the end of the spiral spring may also be formed in one of the spacer columns 46, 47; this gives the additional advantage that the slot is closed by attachment of the plate 45 and the end of the spring thus prevented from emerging from the slot.

FIG. 10 shows another embodiment of the pointer instrument movement which differs from the embodiment previously described as regards the construction of the rocker. The rocker 23a of FIG. 10 is a part made separate from the chassis 6 and secured by means of a strip 24a of metal or plastic, forming the articulation, to the partition 7. Of course, instead of the resilient strip 24a any other suitable articulate connection may be used. This embodiment has the advantage that the material of the rocker can be selected independently of the material of the chassis. The rocker can be made in this manner from metal, plastic or another material. Furthermore, there is greater freedom in the dimensioning of the resilient projection with which the rocker is pressed against the measured value pickup.

Of course, other modifications of the example of embodiment described are possible. Thus, the support plate 14 may be mounted in the same manner as the plate 45 by means of spacer columns. The attachment of the peripheral wall 8 has the advantage that said wall stiffens the partition 7, thus obviating the elasticity of the partition and the bearing and spacer parts formed integrally thereon. Furthermore, at the edge of the partition 7 a peripheral wall may be integrally formed which is closed all round and projects upwardly and downwardly so that together with a bottom it forms a housing enclosing the entire movement. A scale for the pointer 4 and a covering glass may also be secured to such a peripheral wall.

Of course, instead of a vacuum metal capsule 1 any other desired measured value pickup or source may be used which is able to exert a mechanical deflection in dependence upon the measured quantity on the sensing projection 24 of the rocker 23. For example, the measured value pickup may be a bimetal strip so that the pointer movement is then a temperature meter, or the hair or moisture-sensitive filament of a hygrometer.

I claim:

1. A pointer instrument movement comprising:
   (a) a chassis of integrally moulded plastic having a planar partition with a cutout formed therein,
   (b) a lifting member, responsive to air pressure changes
   (c) a measured value pickup for converting changes of a measured quantity to a mechanical deflection of said lifting member, said measured value pickup being mounted on one side of said partition so that said lifting member faces said partition and said mechanical deflection is directed substantially perpendicularly to said partition,
   (d) a pointer shaft mounted on the other side of said partition perpendicular thereto,
   (e) a measured value transducer for converting the mechanical deflection of said measured value pickup into a rotation of said pointer shaft, and
   (f) a rocker in said cutout forming a member of said measured value transducer, one end of said rocker being mounted pivotably on said partition and about an axis parallel to said partition, the other end of said rocker being operably mounted on said lifting member such that the mechanical deflection is transmitted to said rocker, said rocker being formed of plastic integrally with said chassis and said pivot axis of said rocker being formed by an integrally moulded portion of reduced cross-section.

2. A pointer instrument movement according to claim 1 wherein the measured value pickup is secured on a support plate which lies parallel to the partition and which is held by spacer parts integrally formed on the edge of the partition in spaced relationship with the latter.

3. A pointer instrument movement according to claim 2, wherein said spacer parts form a peripheral wall at least partially surrounding the measured value pickup.

4. A pointer instrument movement according to claim 2 wherein a periphery wall is integrally formed at the edge of said partition which belongs to a housing enclosing all the parts of the measured value pickup and the measured value transducer.

5. A pointer instrument movement according to claim 1 further comprising:
   (a) a toothed segment rotatably mounted about a shaft perpendicular to said partition,
   (b) a pinion mounted on said pointer shaft in meshing engagement with said toothed segment,
   (c) an angle lever mounted pivotably about an axis parallel to said partition, said angle lever being located on the side of said partition carrying said pointer shaft and said toothed segment and said angle lever having an arm engaging the end of said rocker and an arm engaging said toothed segment.

6. A pointer instrument movement according to claim 5 further comprising bearing blocks integrally formed with said chassis and bearings inserted in said bearing blocks for supporting said angle lever.

7. A pointer instrument according to claim 6 wherein a rounded projection is integrally formed at the end of said rocker on which an arm of said angle lever bears.

8. A pointer instrument movement according to claim 7, wherein a rounded sensing projection is integrally formed at an intermediate point of said rocker which sensing projection projects towards the measured value pickup and bears on the lifting member.

9. A pointer instrument movement according to claim 8 wherein said rocker is subjected to a resilient biasing means which holds the sensing projection in engagement with the lifting member.

10. A pointer instrument movement according to claim 1, wherein said pointer shaft is mounted at one end in a bearing formed integrally on said chassis and at the other end in a plate disposed parallel to said partition and secured in spaced relationship with said partition by means of spacer columns integrally formed on said chassis.

11. A pointer instrument movement according to claim 10, wherein each of said spacer columns is made hollow at least at the end thereof remote from said chassis and has a portion of reduced cross-section which forms a shoulder and which further comprises a plate having an opening of the same cross-section as said reduced cross-section of said shoulder for bearing on said shoulder, and said plate is secured on said spacer column by a press connection consisting a plug pressed into said hollow interior of said spacer column.

12. A pointer instrument movement according to claim 11, wherein said shaft of said toothed segment is mounted at one end in a blind bearing integrally formed on said chassis and at the other end in said plate.

13. A pointer instrument movement according to claim 12 wherein a slit is provided in a spacer column for anchoring the end of a return spring acting on the pointer shaft.

14. A pointer instrument movement according to claim 12 wherein an anchoring block is integrally formed on said chassis for anchoring the end of a return spring acting on the pointer shaft.

15. A pointer instrument movement according to claim 11, wherein said plug is integrally formed so as to be shearable at the end of the spacer column.

* * * * *